Feb. 14, 1933.  J. Q. GAUBERT ET AL  1,897,253
RADIO COIL AND SHIELD MOUNTING
Filed Feb. 23, 1932  3 Sheets-Sheet 1
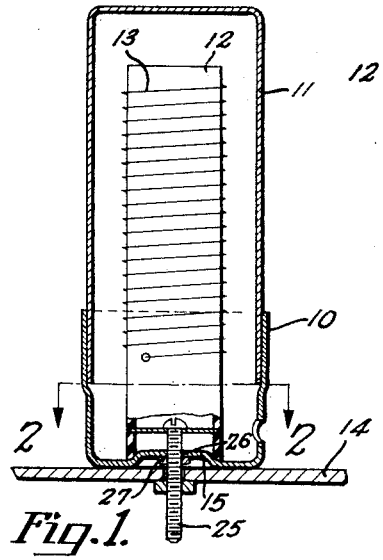
Fig.1.
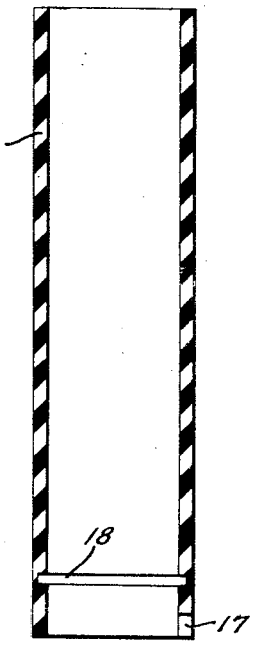
Fig.3.
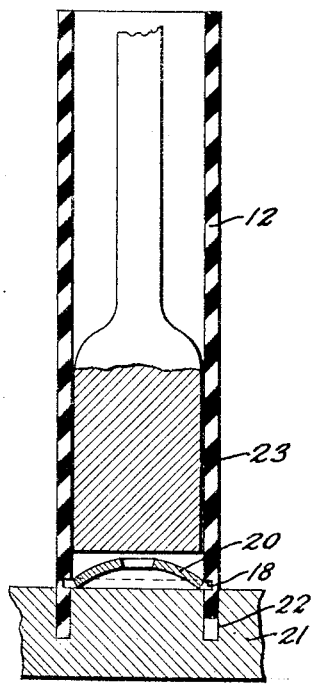
Fig.4.
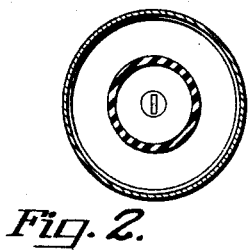
Fig.2.
Fig.6.
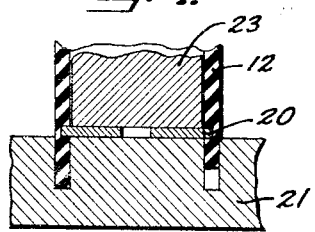
Fig.5.
Fig.7.
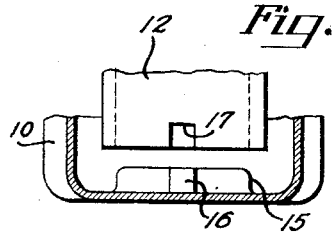
Fig.11.
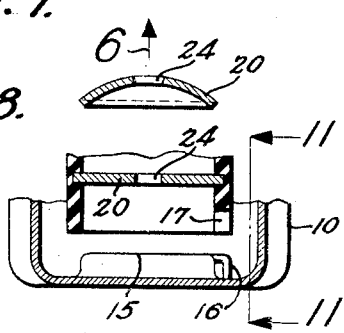
Fig.8.
Fig.10.
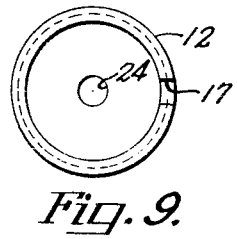
Fig.9.
Inventor
JOHN Q. GAUBERT
HERBERT L. BRUMP
JAMES B. FORSYTHE
By Spencer, Hardman & Hecht
Attorneys

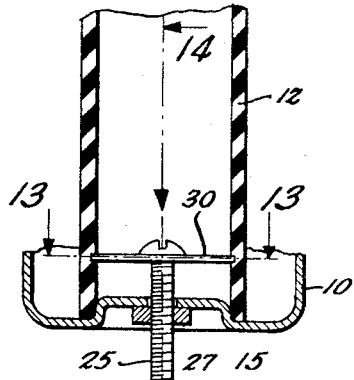
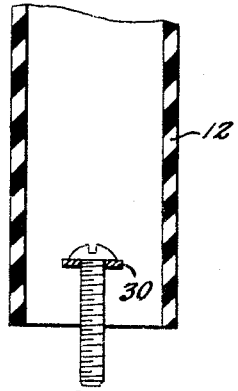
Fig.12.  Fig.14.
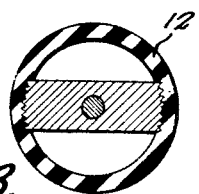
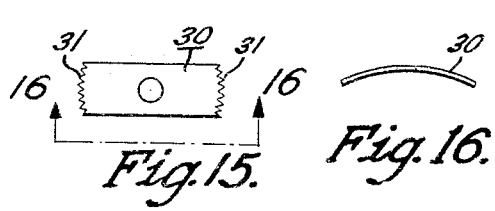
Fig.13.  Fig.15.  Fig.16.
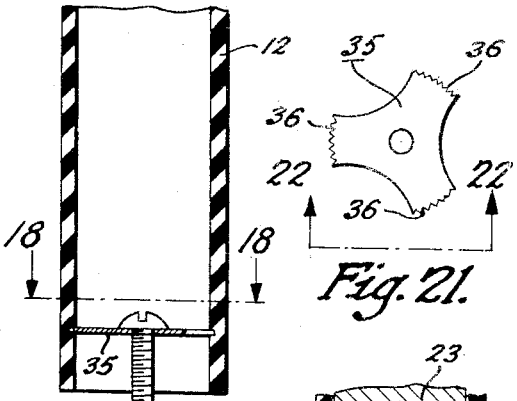
Fig.17.  Fig.21.  Fig.22.
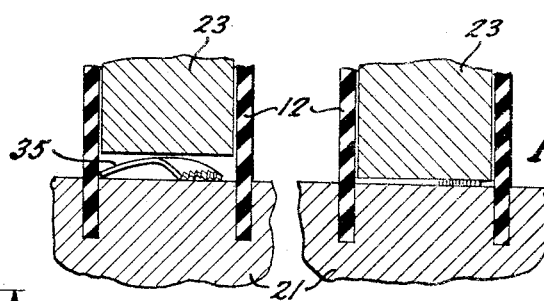
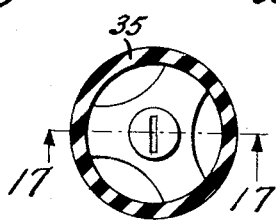
Fig.18.  Fig.19.  Fig.20.

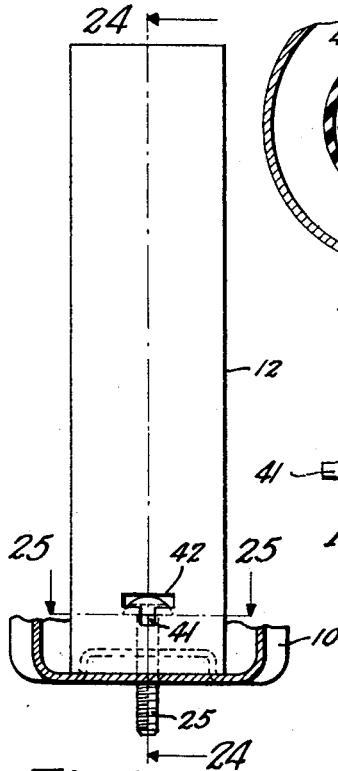
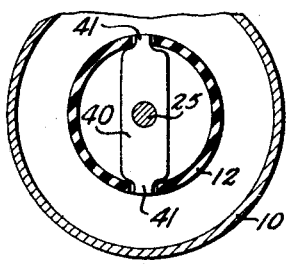
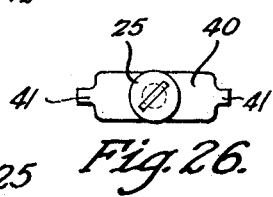
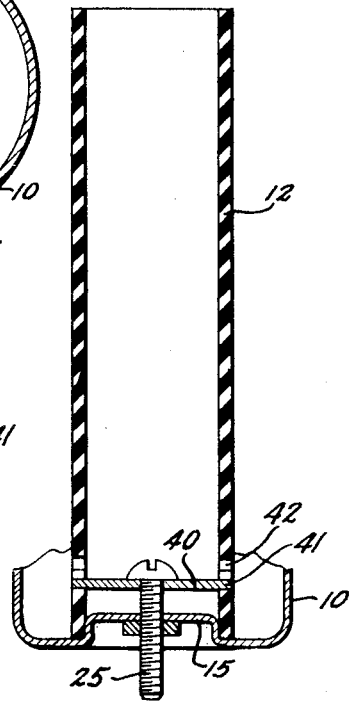
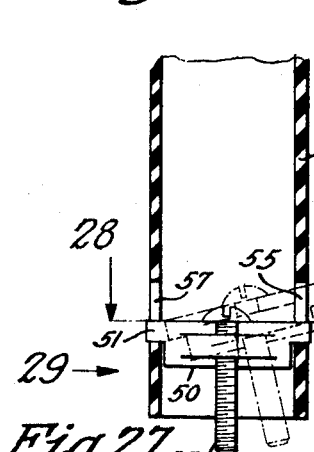
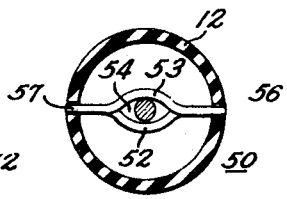
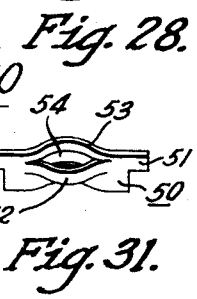
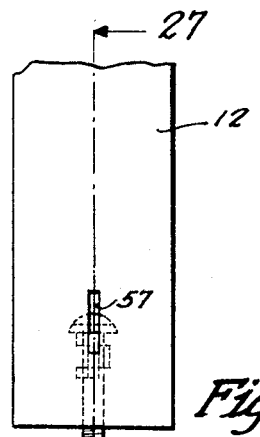
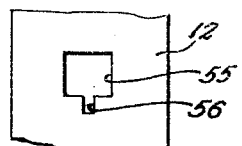

Patented Feb. 14, 1933

1,897,253

UNITED STATES PATENT OFFICE

JOHN Q. GAUBERT, HERBERT L. BRUMP, AND JAMES B. FORSYTHE, OF DAYTON, OHIO, ASSIGNORS TO GENERAL MOTORS RADIO CORPORATION, OF DAYTON, OHIO, A CORPORATION OF OHIO

RADIO COIL AND SHIELD MOUNTING

Application filed February 23, 1932. Serial No. 594,756.

This invention relates to improvements in mountings for electric coils or other electrical devices, particularly such as are used in radio receivers, such, for instance, as mountings for radio frequency coils.

An object of the invention is to provide a very simple and efficient mounting for a coil or similar electrical device, said mounting having a minimum of parts and being very cheap to manufacture.

A feature of this invention is the single screw means for both clamping the coil core tube to the metal shield cup support and also serving as a shank for securing the cup support to a suitable base.

Further objects and advantages of the present invention will be apparent from the following description, reference being had to the accompanying drawings, wherein a preferred embodiment of one form of the present invention is clearly shown.

In the drawings:

Fig. 1 is a vertical section taken through the center of a radio frequency coil support and a shield therefor made according to this invention.

Fig. 2 is a horizontal section taken on the line 2—2 of Fig. 1.

Fig. 3 is a detail view showing a section through the coil supporting tube.

Fig. 4 shows somewhat diagrammatically the method of fixing a metal bridge to the inner walls of the coil tube.

Fig. 5 is similar to Fig. 4 but showing the metal bridge flattened and thereby rigidly fixed to the tube.

Figs. 6, 7 and 8 are detail views showing the metal bridge in its dished form, Fig. 6 being a plan view, Fig. 7 a side elevation, and Fig. 8 a transverse section.

Fig. 9 is a bottom view of the coil tube with the metal bridge expanded into place.

Fig. 10 is a view showing the coil tube being set down into place within the shield support cup.

Fig. 11 is similar to Fig. 10, but is taken on line 11—11 of Fig. 10.

Figs. 12 to 16 show a modification; Fig. 12 shows a vertical section through the coil tube and its supporting cup, Fig. 13 shows a horizontal section taken on line 13—13 of Fig. 12, Fig. 14 is a section taken on line 14—14 of Fig. 12, and Figs. 15 and 16 are detail views showing the metal bridge in dished form.

Figs. 17 to 22 inclusive, show a third form of the invention. Fig. 17 is a vertical section through the coil tube with the metal bridge expanded into place, Fig. 18 is a section on line 18—18 of Fig. 17, Figs. 19 and 20 show somewhat diagrammatically how the dished metal bridge is flattened out and thereby radially expanded and fixed to the coil tube.

Figs. 23 to 26 inclusive, show a fourth form of the invention. Fig. 23 shows a coil tube in elevation rigidly fixed to the shield cup, which cup is cut away to better show the construction, Fig. 24 is a vertical section through the center line of Fig. 23, Fig. 25 is a horizontal section on line 25—25 of Fig. 23, and Fig. 26 is a detail view of the metal bridge with its screw in place.

Figs. 27 to 31 inclusive, show a fifth form of the invention. Fig. 27 is a vertical section through the coil tube and shows in dot-dash lines how the metal bridge may be inserted through an aperture in the wall of said tube, Fig. 28 is a horizontal section on line 28—28 of Fig. 27, Fig. 29 is a side elevation of the coil tube with the bridge inserted in place as viewed in the direction of arrow 29 in Fig. 27, Fig. 30 is a side view of the coil tube showing the large aperture therein taken in the direction of arrow 30 of Fig. 27, and Fig. 31 is a perspective view of the metal bridge shown in Fig. 27.

Similar reference characters refer to similar parts throughout the several views.

The form shown in Figs. 1 to 11 will now be described.

Numeral 10 designates a pressed metal shield cup which serves as a support for the metal shield 11 telescoped therein and also as a support for the insulating coil tube 12 upon which is wound the electric coil 13. Coil 13 may be an inductance used in radio receiver sets and is electrically shielded from other parts of the set by the metal shield 11. Cup 10 is provided with a circular depression 15 in its bottom wall which fits snugly within the bottom of the coil tube 12. This depression 15 has a metal lug 16 bent outwardly therefrom and engaging a notch 17 in the bottom of coil tube 12 to properly locate and positively prevent relative rotation between these parts when tube 12 is set down upon the raised portion 15. Tube 12 is preferably formed of a suitable non-metallic insulation material such as fiber impregnated with bakelite. Tube 12 has an internal groove 18 cut therein adjacent its bottom end, as shown in Fig. 3. The metal bridge 20 is first made in dished form, as shown in Figs. 6, 7 and 8, and of such diameter that it may be inserted within tube 12. Bridge 20 is rigidly fixed to the interior walls of tube 12 by having its dish flattened out, as shown in Figs. 4 and 5.

Figs. 4 and 5 show a suitable means for so flattening out the metal bridge 20. 21 is an anvil having a circular groove 22 cut therein into which tube 12 may be inserted so that the groove 18 therein lies flush with the top of anvil 21. The metal bridge 20 is then dropped into place and the punch 23 pressed down thereupon, as shown in Fig. 4, thus causing bridge 20 to be flattened out and radially expanded into the groove 18, as shown in Fig. 5. This provides a very cheap method of permanently fixing a metal bridge to the interior walls of the tube 12. Tube 12 with bridge 20 fixed therein is then set down upon the raised portion 15 of cup 10, as shown in Figs. 10 and 11, with the lug 16 fitting snugly within notch 17 in the bottom of tube 12. The screw 25 is then dropped in place through the aperture 24 of bridge 20 and through the aperture 26 at the center of the raised portion 15 and nut 27 screwed home to rigidly clamp the tube 12 in its proper position at the center of the cup 10. Of course, the coil 13 together with its proper leads (not shown) may be first applied to the tube 12 prior to tube 12 being clamped within the cup 10, as above described. Finally the metal shield cup 11 is telescoped within the cup 10, as shown in Fig. 1. Screw 25 projects downwardly some distance below the bottom of cup 10 and thus serves as a shank means by which the assembled unit may be suitably attached to a supporting base, such for instance, as the sheet metal frame 14 of the receiver chassis.

In radio frequency coils used in radio receiving sets it is very important for the sake of uniform electrical values that the coil 13 be always located the same distance from the shield 11 in all units of the same design. Therefore it is essential that the tube 12 be precisely located relative to the cup 10 and shield 11. This invention provides a very simple, cheap and effective means for doing this.

The form shown in Figs. 12 to 16 is similar in all respects to the form above described with the exception of the metal bridge 30 within the tube 12. In this form the metal bridge 30 is merely a curved metal strip having toothed ends 31, as shown in Figs. 15 and 16. This bridge 30 is expanded radially into place by the same method as shown in Figs. 4 and 5 with the exception, however, that no interior groove is necessary within the tube 12. When bridge 30 is flattened out the teeth 30 bite into the material of the walls of tube 12, as shown in Fig. 13, and thus bridge 30 is very rigidly secured within tube 12. The rest of the assembling is done exactly as described above.

The third form of the invention, as shown in Figs. 17 to 22 inclusive, is exactly like that shown in Figs. 12 to 16, except for the shape of the metal bridge 35. This metal bridge 35 is first made in dished form and has three prongs each terminating in a toothed edge 36 all lying within a circle of a diameter only slightly less than the interior diameter of tube 12 (see Figs. 21 and 22). This metal bridge 35 is radially expanded into place between anvil 21 and punch 23 as clearly shown in Figs. 19 and 20, and as above described in reference to Figs. 4 and 5. The teeth 36 of the bridge 35 bite into the non-metallic material of tube 12 and thus the bridge is very rigidly secured thereto. The rest of the assembling is done as above described.

In the form shown in Figs. 23 to 26 inclusive, the metal bridge 40 is a flat metal bar having reduced lugs 41 at opposite ends thereof, as shown in Fig. 26. The tube 12 is provided with diametrically opposed T-shaped slots 42 which permit the lateral insertion of the metal bridge 40 therein. Bridge 40 is simply slipped into place through the wide portion of the slots 42 and then dropped down so that the two end lugs 41 rest within the bottoms of the T-shaped slots. It will thus be seen that when the screw 25 is inserted and clamped in place that it will be impossible for any relative motion to occur between the assembled parts. The assembling of the rest of the parts is done exactly as described hereinabove for the prior forms.

The form shown in Figs. 27 to 31 is similar to that of Figs. 23 to 26. The metal bridge 50, as shown in Fig. 31, is first blanked out from flat sheet metal with the two end lugs 51. It is then slit at the center and the portion 52 bent outwardly on one side and the two portions 53 bent outwardly on the opposite side to provide a central aperture 54 of sufficient size to permit the screw 25 to be inserted therethrough in the plane of the metal bridge 50. The coil tube 12 is provided on one side with the aperture 55 having a notch 56 in the bottom thereof and on the diametrically opposed side is provided with a narrow slot 57 of such width to receive an end lug 51 of metal bridge 50. To assemble bridge 50 upon tube 12 the bridge is passed laterally through the large aperture 55, as shown in dotted lines in Fig. 27, until one end lug 51 is inserted in the narrow slot 57. The bridge 50 is then dropped down until the opposed lug 51 rests within the notch 56 in the large aperture 55, as shown in full lines in Fig. 27. The screw 25 is then inserted into place through the aperture 54 in bridge 50 so that the head of the screw rests upon the top edge of the bent portion 53 of bridge 50. The assembling with the rest of the parts is done exactly as described hereinabove with the other forms.

It will be noted that in the two forms last described the separate operation of fixing the metal bridge to the interior walls of the tube 12 is done away with, and that in both of these last two forms relative movement between the tube 12 and the metal bridge is prevented by end shoulders on the bridge engaging the interior walls of the tube 12 after the bridge is dropped into its final position within the apertures in tube 12.

In all five forms of the invention the tube 12 is positively fixed in its proper location relative to cup 10 by the single screw 25 without possibility of deviation from this precise location in the various units in any one design. It is thus seen that the capacity effect of the cup 10 and shield 11 relative to the radio frequency coil 13 will be exactly the same in all units and hence uniformity in electrical values will be obtained in all units in mass production. This uniformity in electrical values is the chief problem aimed at and solved by a simple construction in the various forms of this invention.

While the form of embodiment of the present invention as herein disclosed, constitutes a preferred form, it is to be understood that other forms might be adopted, all coming within the scope of the claims which follow.

What is claimed is as follows:

1. In combination, a shield support cup having an aperture in its bottom, a coil core insulating tube having its bottom end supported upon said cup bottom, and means for rigidly fixing said tube to said cup, said means comprising: an interior metal bridge secured to the sides of said tube and having an aperture therein, and a screw extending through said apertures in said bridge and cup bottom and also projecting beyond said cup bottom and serving as a securing shank for said cup.

2. In combination, a shield support cup having an aperture in its bottom, a coil core insulating tube having its bottom end supported upon said cup bottom, and means for rigidly fixing said tube to said cup, said means comprising: an interior metal bridge secured to the sides of said tube and having an aperture therein, and a headed screw extending through said bridge aperture and said cup aperture for rigidly clamping said tube to said shield cup in insulated relation therewith.

3. In combination a shield support cup having an aperture in its bottom, a coil core insulating tube having its bottom end supported upon said cup bottom, and means for rigidly fixing said tube to said cup, said means comprising: an interior metal bridge secured to the sides of said tube and having an aperture therein, and a metal pin extending through said two apertures for clamping said tube to said cup bottom.

4. In combination, a shield support cup having an aperture in its bottom, a coil core insulating tube having its bottom end supported upon said cup bottom, and means for rigidly fixing said tube to said cup, said means comprising: an interior metal bridge fixed to the interior walls of said tube by radial expansion thereof, and a screw clamping said bridge to said cup bottom.

5. In combination, a shield support cup having an aperture in its bottom, a coil core insulating tube having its bottom end supported upon said cup bottom, and means for rigidly fixing said tube to said cup, said means comprising: an interior metal bridge fixed to the interior walls of said tube by radial expansion thereof, and a screw clamping said bridge to said cup bottom, said screw projecting beyond said cup bottom and serving as a securing shank for fixing said cup to a base.

6. In combination, a metal support cup having an aperture in its bottom, a non-metallic tube having one end resting upon said cup bottom, an interior metal bridge secured to the side walls of said tube and having an aperture therein, and a screw extending through said apertures in said bridge and cup bottom for clamping said tube to said cup.

7. In combination, a metal support cup having an aperture in its bottom, a non-metallic tube having one end resting upon said cup bottom, an interior metal bridge secured to the side walls of said tube and having an aperture therein, and a screw extending through said apertures in said bridge and cup bottom for clamping said tube to said cup, said screw also projecting beyond said cup bottom and serving as a securing shank for said cup.

8. In combination, an elongated metallic receptacle having a circular cross-section, an elongated electrical device within said receptacle, a threaded securing means affixed to said receptacle and projecting a substantial distance below said receptacle base, said threaded means being adapted to function as a shank for securing the receptacle to the metallic frame of a radio receiver chassis, and a nut for rigidly securing said shank in place when positioned in an aperture provided in said frame.

In testimony whereof I hereto affix my signature.

JOHN Q. GAUBERT.

In testimony whereof I hereto affix my signature.

HERBERT L. BRUMP.

In testimony whereof I hereto affix my signature.

JAMES B. FORSYTHE.